United States Patent
Choi

(10) Patent No.: US 7,602,865 B2
(45) Date of Patent: Oct. 13, 2009

(54) APPARATUS AND METHOD FOR ENHANCING A RECEPTION RATE OF A RECEIVER

(75) Inventor: Woong-Gil Choi, Daejon (KR)

(73) Assignee: LG Electronics Inc., Seoul (KR)

( * ) Notice: Subject to any disclaimer, the term of this patent is extended or adjusted under 35 U.S.C. 154(b) by 571 days.

(21) Appl. No.: 10/994,906

(22) Filed: Nov. 22, 2004

(65) Prior Publication Data

US 2005/0141656 A1    Jun. 30, 2005

(30) Foreign Application Priority Data

Nov. 22, 2003    (KR) ................ 10-2003-0083336

(51) Int. Cl.
    *H04L 27/08*    (2006.01)
(52) U.S. Cl. .................... 375/345; 375/316; 455/245.1; 455/324; 455/234.1
(58) Field of Classification Search ................ 375/345, 375/316; 455/239, 234, 245, 245.1, 234.1, 455/324
    See application file for complete search history.

(56) References Cited

U.S. PATENT DOCUMENTS

| 6,240,100 | B1 | 5/2001 | Riordan et al. .............. 370/442 |
| 6,307,902 | B1 | 10/2001 | Walley |
| 6,321,073 | B1 * | 11/2001 | Luz et al. ................. 455/239.1 |
| 6,482,042 | B1 | 11/2002 | Tupper |
| 6,516,185 | B1 | 2/2003 | MacNally et al. ........ 455/234.1 |
| 6,760,674 | B2 * | 7/2004 | Bombard ..................... 702/76 |
| 7,010,278 | B2 * | 3/2006 | Kirschenmann et al. . 455/114.2 |
| 2002/0114413 | A1 | 8/2002 | Zarubinsky |
| 2003/0003891 | A1 | 1/2003 | Kivekas et al. |
| 2003/0169114 | A1 | 9/2003 | Manapragada .............. 330/279 |
| 2003/0174641 | A1 | 9/2003 | Rahman |

FOREIGN PATENT DOCUMENTS

| EP | 1 089 427 A1 | 4/2001 |
| EP | 1 172 928 A2 | 1/2002 |
| JP | 5011521 U | 2/1993 |
| JP | 6244754 | 9/1994 |
| JP | 2806825 | 12/1996 |
| JP | 9238171 | 9/1997 |
| JP | 09-321559 | 12/1997 |
| JP | 10065466 | 3/1998 |
| JP | 10233815 | 9/1998 |
| JP | 10341267 | 12/1998 |
| JP | 2001086172 | 3/2001 |
| JP | 2001-268145 | 9/2001 |
| JP | 2003-309435 | 10/2003 |
| JP | 2003309615 | 10/2003 |
| WO | WO 01159927 | 8/2001 |
| WO | WO 03/005562 A2 | 1/2003 |

* cited by examiner

*Primary Examiner*—Chieh M. Fan
*Assistant Examiner*—Eva Puente
(74) *Attorney, Agent, or Firm*—Lee, Hong, Degerman, Kang & Waimey

(57) ABSTRACT

A system and method is disclosed for enhancing a reception rate for a mobile communication system. A system is provided comprising a demodulator for separating a received signal into an I signal and a Q signal, an amplifier for amplifying the I signal and Q signal from the demodulator, and an offset adjusting unit. The offset adjusting unit is provided for amplifying an amplified I signal and an amplified Q signal, comparing a difference signal determined between the amplified I signal and the amplified Q signal with a target value, and outputting an amplification control signal associated with the difference signal and an amplification offset value.

23 Claims, 6 Drawing Sheets

FIG. 4

| CONTROL LEVEL (dB) | AGC1 (dB) | AGC2 (dB) | AGC3-I (dB) | AGC3-Q (dB) |
|---|---|---|---|---|
| ... | ... | ... | ... | ... |
| 80 | 30 | 25 | 25 | (AGC3-I) + OFFSET VALUE |
| 79 | 30 | 25 | 24 | (AGC3-I) + OFFSET VALUE |
| 78 | 30 | 25 | 23 | (AGC3-I) + OFFSET VALUE |
| ... | ... | ... | ... | ... |
| 37 | 15 | 10 | 12 | (AGC3-I) + OFFSET VALUE |
| 36 | 15 | 10 | 11 | (AGC3-I) + OFFSET VALUE |
| 35 | 15 | 10 | 10 | (AGC3-I) + OFFSET VALUE |
| ... | ... | ... | ... | ... |

APPARATUS AND METHOD FOR ENHANCING A RECEPTION RATE OF A RECEIVER

CROSS-REFERENCE TO RELATED APPLICATIONS

Pursuant to 35 U.S.C. § 119(a), this application claims the benefit of earlier filing date and right of priority to Korean Application No. 10-2003-0083336, filed on Nov. 22, 2003, the contents of which are hereby incorporated by reference herein in their entirety.

BACKGROUND OF THE INVENTION

1. Field of the Invention

The present invention relates to a wireless system and, more particularly, to an apparatus and method for improving a reception rate of a receiver comprising an automatic gain control and an I and Q offset correction function for compensating signal degradation characteristics is disclosed.

2. Description of the Related Art

Radio frequency bands are closely spaced between mobile communication providers. The close spacing near a base station causes degradation in a reception rate between mobile communication providers resulting in a coverage hole in mobile communication service. To improve the reception rate in a coverage hole, automatic gain control (AGC) circuitry is utilized to remove entirely or reduce at least partially modulation or saturation phenomenon generated within the mobile terminal. The automatic gain control circuitry measures the received electric field strength. A low noise amplifier adjusts a signal gain of a mobile terminal.

Referring to FIG. 1, a conventional receiver block comprises an RF unit 10 and a demodulator unit 20. The demodulator unit 20 detects a level of signal power in a power detector 40. The signal power is feedback to control a level for an automatic gain control amplifier.

Referring to FIG. 2, the process is illustrated for amplitude adjusting two channels of a receiver. An RF signal is demodulated into an I and Q channel signal. An offset power level is introduced while creating an I and Q channel signal. The I and Q channel signals are amplitude adjusted using baseband information from an a table 51. An AGC amplifier is controlled using baseband signal information located in the table 51 for amplitude adjusting the I and Q channel signals. An offset adjustment unit 50 comprising a level detector 52, the table 51, and a feedback network is required to correct for amplitude differences between the I and the Q channels. This offset adjustment unit is a complex circuit which introduces processing time delay.

Therefore, there is a need for a system that overcomes the above problems and provides advantages over other signal amplitude adjustment processing systems.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one embodiment, a system is provided comprising a demodulator for separating a received signal into an I and a Q signal and outputting the I signal and the Q signal, an amplifier for amplifying the I and Q signal from a demodulator output, and an offset adjusting unit. The offset adjusting unit receives the amplified I signal output and the amplified Q signal output, compares a difference signal between the amplified I signal and the amplified Q signal with a target value, and generates an amplification control signal associated with the difference signal and an amplification offset value. The amplification control signal is inputted to the amplifier for adjusting gain of the amplifier. A power detector, in one example, performs a square root of the sum of squared values of the amplified I signal and the amplified Q signal.

In one embodiment, a method is provided comprising demodulating an incoming signal into an I signal and a Q signal, amplifying and canceling noise of the I signal and the Q signal and outputting an amplified I and Q signal, and detecting the power level of the amplified I signal and the Q signal and an amplification offset value and outputting a detected power level. The method further comprises processing the detected power level against a target value to create a difference value. The method further comprises selecting a gain value in accordance with the difference value and the offset value and adjusting amplification for amplifying the I signal and the Q signal based on the gain value and correcting the amplification offset value.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments.

The invention will be described in detail with reference to the following drawings in which like reference numerals refer to like elements wherein:

FIG. 1 is a block diagram illustrating a conventional automatic gain control unit using a power detector.

FIG. 2 is a block diagram illustrating a conventional automatic gain control unit using a level detector and AGC table.

FIG. 3 is a block diagram illustrating a system for enhancing a reception rate for receiving signals including automatic gain control in accordance with an embodiment of the present invention.

FIG. 4 is a table illustrating an I and Q automatic gain control table for providing automatic control in accordance with an embodiment of the present invention.

FIG. 5 is a flow chart illustrating a method of the present invention for enhancing a reception rate of a receiver having automatic gain control in accordance with an embodiment of the present invention.

Figure 6:
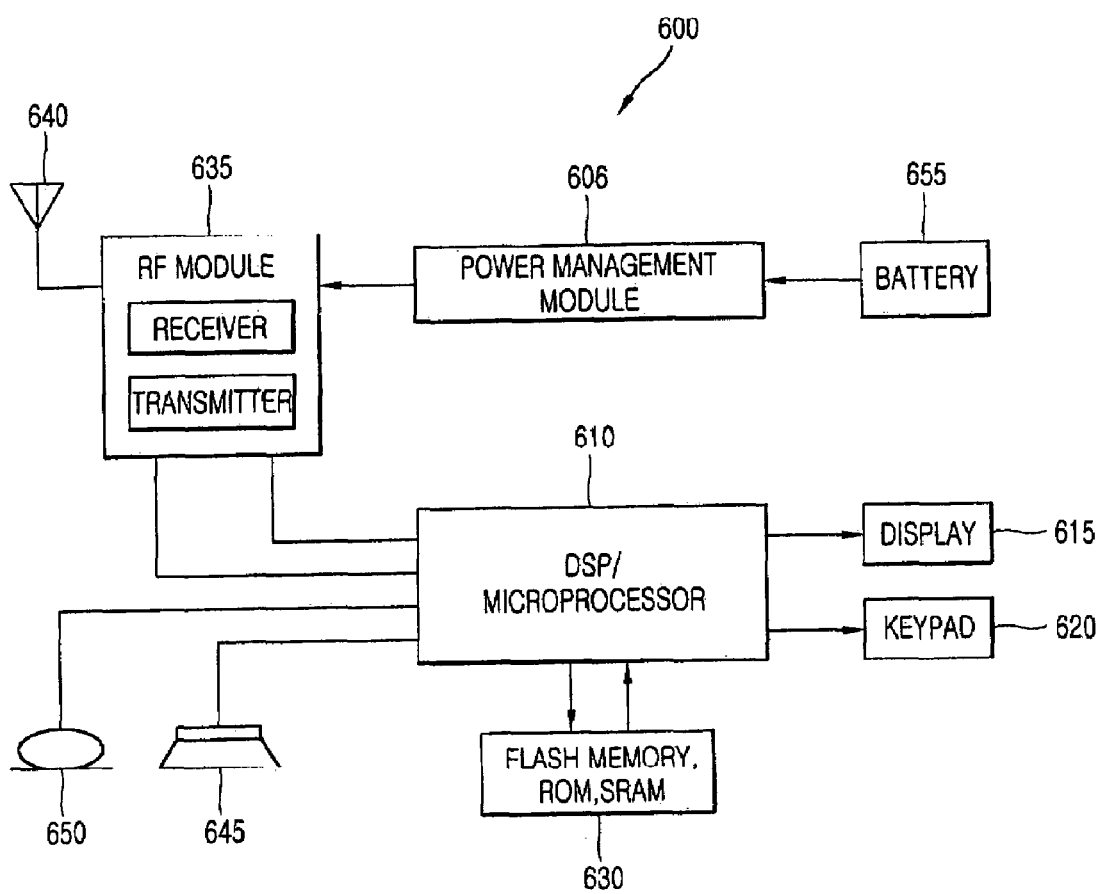

FIG. 6. is a block diagram illustrating a mobile terminal utilizing the methods of the present invention.

DETAILED DESCRIPTION OF THE PREFERRED EMBODIMENTS

The invention relates to a system and method for enhancing a reception rate of a mobile terminal for receiving signals using an automatic gain control with an I and Q offset correction function is provided.

Although the invention is illustrated with respect to a mobile terminal, it is contemplated that the invention may be utilized anywhere it is desired for transmitting, receiving, or processing signals. Reference will now be made in detail to the preferred embodiments of the present invention, examples of which are illustrated in the accompanying drawings.

Figure 1:
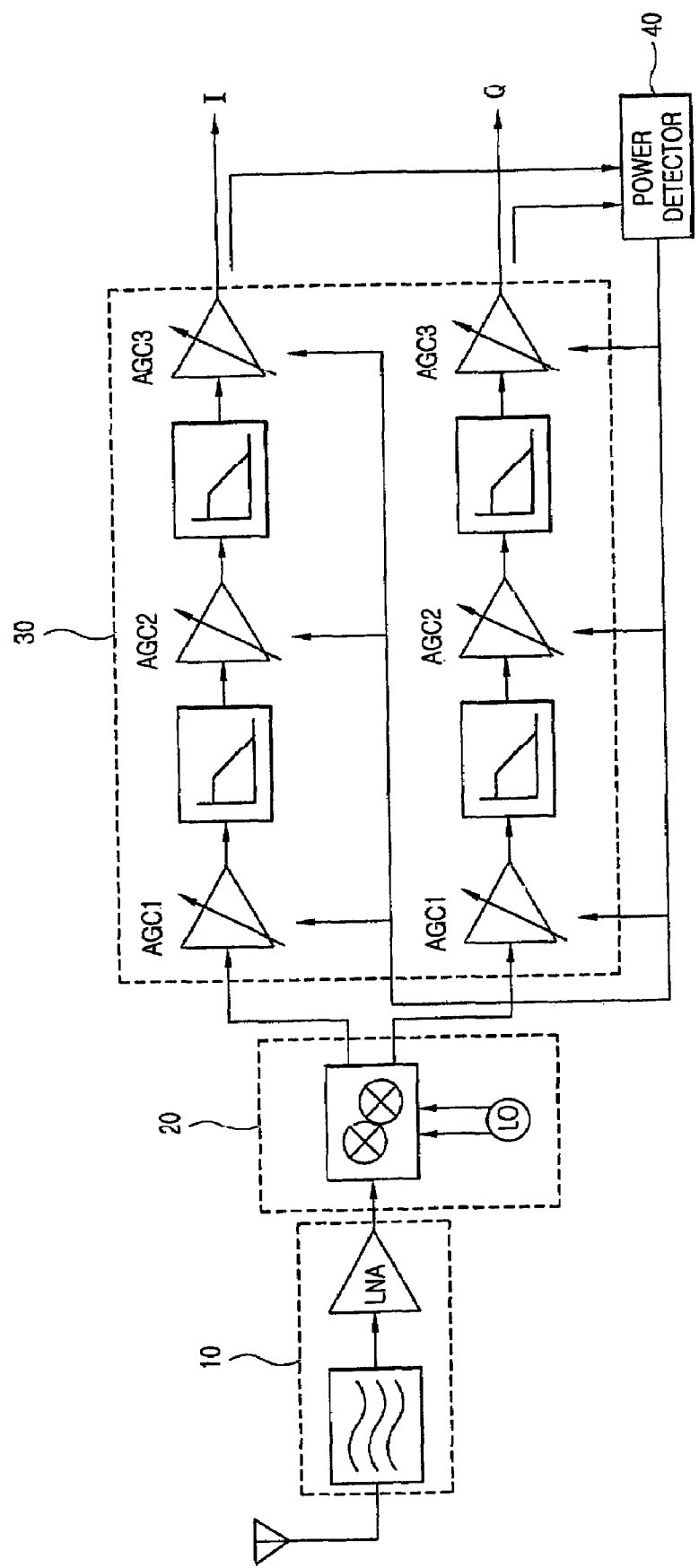
Figure 2:
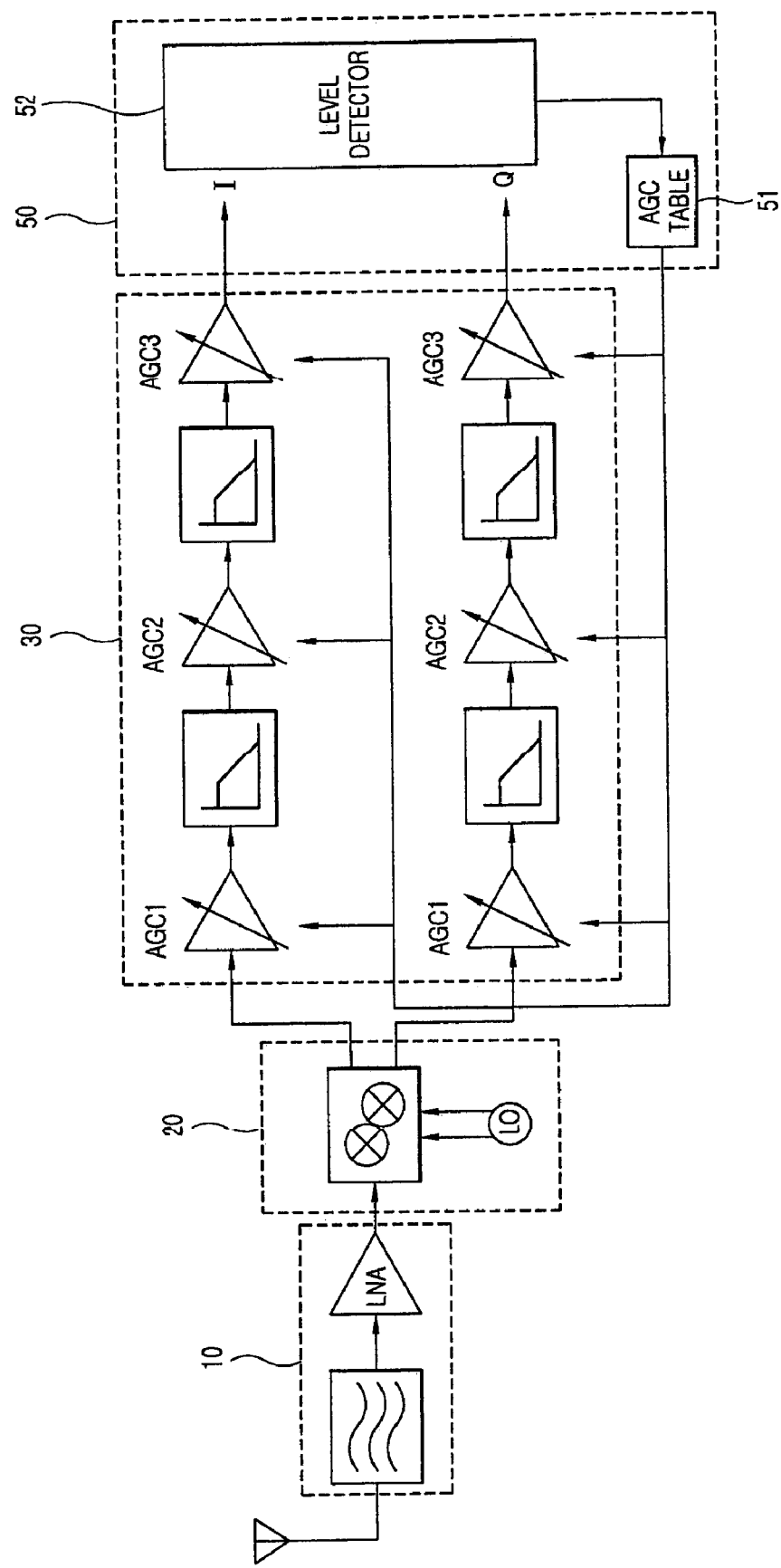
Figure 3:
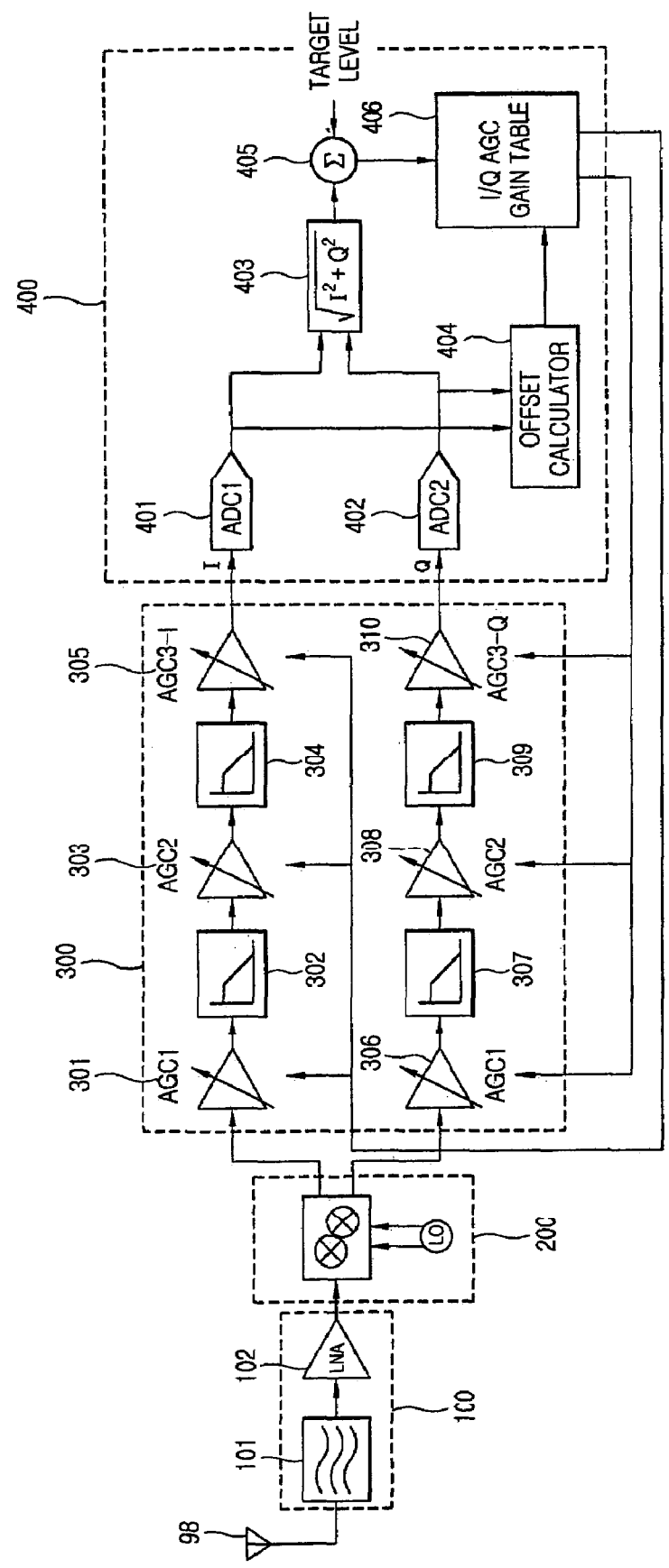

Referring to FIG. 3, a system is provided including an RF unit 100, a demodulating unit 200, offset adjusting unit 400, and amplifying unit 300. The RF unit 100 is provided comprising a band pass filter (BPF) 101 and a low noise amplifier (LNA) 102. The RF unit 100 detects a signal inputted to an antenna 98. The demodulating unit 200 comprises a demodulator 201 and a local oscillator (LO). The demodulating unit 200 separates a signal outputted from the RF unit 100 into an in-phase channel, an I signal, and a quadrature-phase channel, a Q signal, and outputs these signals.

The amplifying unit 300 amplifies the I signal and the Q signal outputted from the demodulating unit 200. A first I amplifier 301 having an AGC1 input control amplifies the I signal received from the demodulating unit 200, for example, according to an amplification control signal. The amplification control signal adjusts the gain to equalize the I signal and the Q signal. A first I filter 302 receives a first I amplifier output signal. The first I filter 302 receives a first I amplifier output signal, cancels noise in the first I amplifier output signal, and outputs a first I filter output signal.

A second I amplifier 303 having AGC2 input control amplifies the first I filter output signal, according to a corresponding amplification control signal. A second I filter 304 receives a second I amplifier output signal, cancels noise mixed in the second I amplifier output signal, and outputs a second filter I output signal in a second amplifier output. An I offset amplifier 305 having AGC control amplifies, according to an amplification control signal, a signal outputted from the second I filter 304 and outputting an offset-corrected I phase signal.

A first Q amplifier 306 having AGC1 input control amplifies, according to a corresponding amplification rate control signal, the Q signal received from the demodulating unit 200. A first Q filter 307 cancels noise mixed in a signal outputted from the first Q amplifier 306. A second Q amplifier 308 having AGC2 input control amplifies a signal outputted from the first Q filter 307 according to an amplification control signal. A second Q filter 309 cancels noise mixed with of a signal outputted from the second Q amplifier 308. A Q offset amplifier 310 amplifies, according to an amplification control signal, a signal outputted from the second Q filter 309 and outputs an offset-corrected Q signal.

The offset adjusting unit 400 performs an offset calculation. The offset adjusting unit 400 receives a Q offset amplifier output signal and an I offset amplifier output signal. A first analog-to-digital converter (ADC) 401 detects a power level and an offset value from the I output signal and generates an equivalent digital signal value ADC1 out. A second ADC 402 detects a power level and an offset value from the Q output signal and generates an equivalent digital signal value ADC2 out. A power detector 403 processes ADC1 out and ADC2 out and outputs a power detector output. An offset calculator 404 processes ADC1 out and ADC2 out calculating an amplification offset value of the I and Q signals and outputting to a compare/calculate unit 405.

The compare/calculate unit 405, which for example is a processor, calculates a difference value between the power detector output and a target value. A user, for example, inputs the target value. The compare/calculate unit 405 outputs the difference value, in one example, as a positive or negative number. A table unit 406 outputs a plurality of amplification control signals corresponding to inputs from the compare/calculate unit 405. The table unit 406 outputs an amplification control signal utilizing the amplification offset adjustment, as shown above, from the offset calculator.

The table unit 406 outputs, in this example, an amplification control signal comprising a first amplification control signal, second amplification control signal, third amplification control signal, and a forth amplification control signal. The first amplification control signal is applied to the AGC I control input of the first I and Q amplifiers 301 and 306. The second amplification control signal is applied to the AGC2 control input of the second I and Q amplifiers 303 and 308. The third amplification control signal through the AGC3-I input corrects for offsets of the I offset amplifier 305. The forth amplification control signal through AGC3-Q input corrects for offsets of the Q offset amplifier 310. The table unit 406 adjusts the relative values of the amplification unit 300 outputs utilizing an amplification offset value for adjusting the amplification control value.

Referring to FIG. 4, an I/Q AGC gain table is illustrated of the table unit 406. Control levels, in this example, are recorded and stored for control inputs AGC1, AGC2, AGC3-I and AGC3-Q. These control levels are used as the amplification control signal of each amplifier of the amplifying unit 300.

Figure 5:
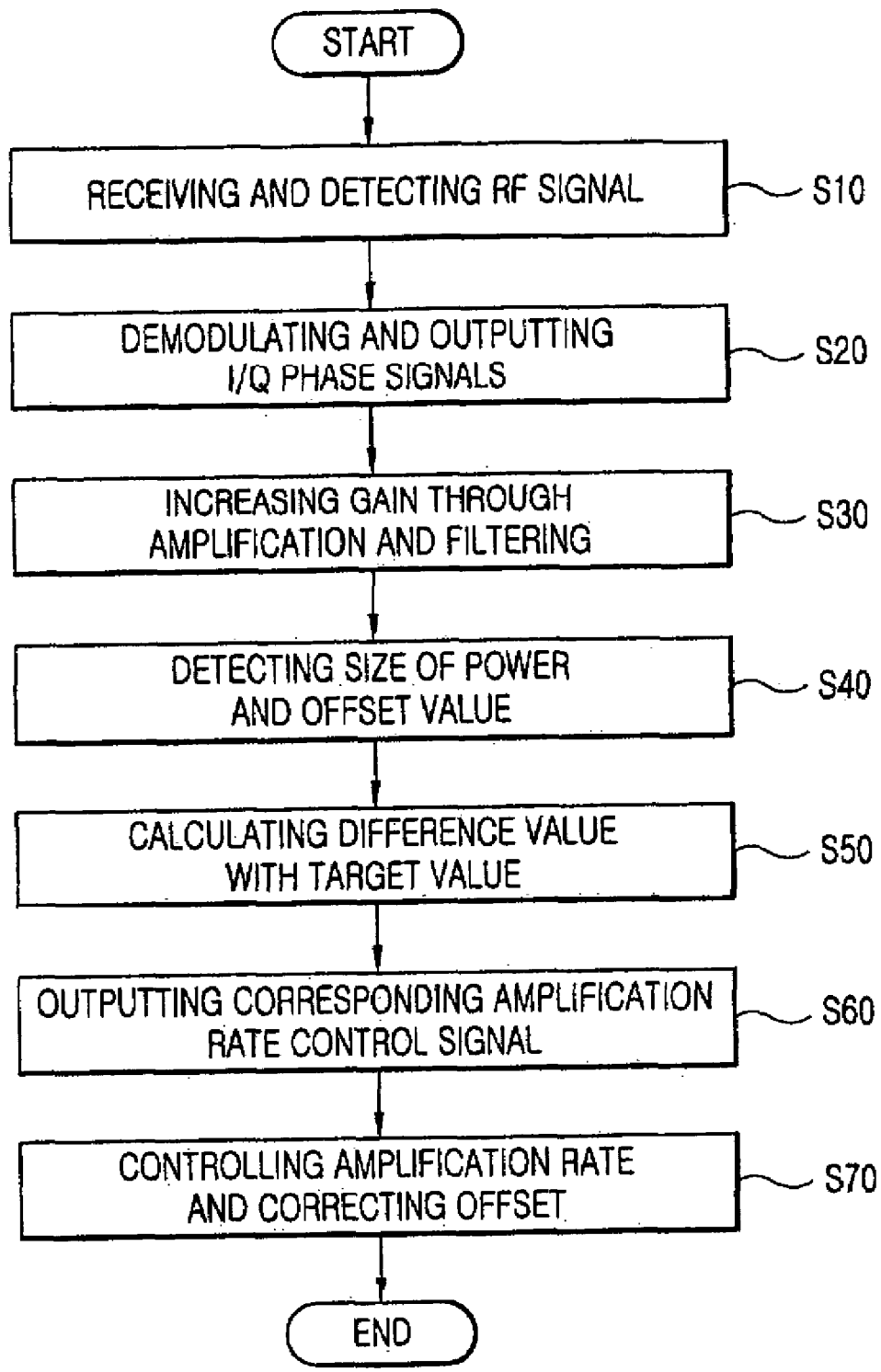

Referring to FIG. 5, a method of the present method is illustrated. The method discloses receiving and detecting a mobile communication signal from the RF signal received from an antenna (S10). The mobile communication signal is inputted to a demodulating unit 200. The mobile communication signal is demodulated. The demodulation process outputs the RF signal as I and Q signals (S20). The I and Q signals are amplified and filtered by an amplification unit (S30). For example, the amplification unit comprises amplifying the I and Q phase signals in first I and Q amplifiers 301 and 306, filtering output signals from the first I and Q amplifiers 301 and 306 using a first I filter 302 and a first Q filter 307 respectively to remove noise. The method disclosed further comprises amplifying output signals from the I filter 302 and the Q filter 307 using a second I amplifier 303 and a second Q amplifier 308 respectively, and filtering output signals from the second I amplifier 303 and the second Q amplifier 308 to remove a noise using a second I filter 304 and a second Q filter 309. The method disclosed further comprises amplifying outputs from the second I filter 304 and a second Q filter using an I offset amplifier 305 and Q offset amplifier 310 for adjusting I and Q signal values. (see FIGS. 3 and 4), The method disclosed further comprises applying the I and Q phase signals are applied to the offset adjusting unit 400 to detect the power level and the offset value (S40). A calculate/compare unit 405 calculates a difference value comparing the detected size with a target level. A table unit 406 searches a corresponding amplification control signal according to the difference value and outputs it to the amplifying unit 300 (S60). The amplification control signal is applied to each amplifier of the amplifying unit 300 for controlling the amplification, and the I and Q offset amplifiers to correct for an amplification offset value (S70).

The following is an example utilizing a mobile communication device using the methods of the present invention.

Referring to FIG. 6, the mobile communication device 600 comprises a processing unit 610 such as a microprocessor or digital signal processor, an RF module 635, a power management module 606, an antenna 640, a battery 655, a display 615, a keypad 620, a storage unit 630 such as flash memory, ROM or SRAM, a speaker 645 and a microphone 650.

A user enters instructional information, for example, by pushing the buttons of a keypad 620 or by voice activation using the microphone 650. The processing unit 610 receives and processes the instructional information to perform the appropriate function. Operational data may be retrieved from the storage unit 630 to perform the function. Furthermore, the processing unit 610 may display the instructional and operational information on the display 615 for the user's reference and convenience.

The processing unit 610 issues instructional information to the RF module 635, to initiate communication, for example, transmit radio signals comprising voice communication data. The RF module 635 comprises a receiver and a transmitter to receive and transmit radio signals. The antenna 640 facilitates the transmission and reception of radio signals. Upon receive radio signals, the RF module 635 may forward and convert the signals to baseband frequency for processing by the processing unit 610. The processed signals would be transformed into audible or readable information outputted via the speaker 645.

The processing unit 610 performs the methods and provides the systems as illustrated in FIGS. 3-5. As an example, the processing unit 610 utilizes the method for enhancing a reception rate in a mobile communication terminal comprising demodulating an incoming signal into an I signal and a Q signal, amplifying and canceling noise of the I signal and the Q signal and outputting an amplified I and Q signal, and detecting the power level of the amplified I signal and the Q signal and an amplification offset value and outputting a detected power level. The method disclosed further comprises comparing and calculating the detected power level against a target value to create a difference value, and selecting a gain value in accordance with the difference value and the offset value, and adjusting amplification for amplifying the I signal and the Q signal based on the gain value and correcting the amplification offset value.

Other features, as described above in FIGS. 3-5, may be incorporated as well into the processing unit 610.

The processing unit 610 stores the messages received from and messages transmitted to other users in the storage unit 630, receives a conditional request for message input by the user, and processes the conditional request to read data corresponding to the conditional request from the storage unit. The processing unit 610 outputs the message data to the display unit 615. The storage unit 630 is adapted to store message data of the messages both received and transmitted.

Although the present invention is described in the context of a mobile terminal, the present invention may also be used in any wired or wireless communication systems using mobile devices, such as PDAs and laptop computers equipped with wired and wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, system or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention. Further, with respect to the claims, it should be understood that any of the claims described below may be combined for the purposes of the present invention.

The foregoing embodiments and advantages are merely exemplary and are not to be construed as limiting the present invention. The present teaching can be readily applied to other types of systems. The description of the present invention is intended to be illustrative, and not to limit the scope of the claims. Many alternatives, modifications, and variations will be apparent to those skilled in the art. Accordingly, the invention is not limited to the precise embodiments described in detail hereinabove.

What is claimed is:

1. A system for enhancing a reception rate for a mobile communication device, the system comprising:
   a demodulator for separating a received signal into an I signal and a Q signal and then outputting the separated I and Q signals;
   an amplifier for amplifying the separated I and Q signals and outputting the amplified I and Q signals, each of the amplified I and Q signals having a power level value and an offset value; and
   an offset adjusting unit for:
      detecting the power level value and the offset value of the amplified I signal and converting the detected power level and the offset value to a first digital power value and a first digital offset value using a first analog to digital converter,
      detecting the power level value and the offset value of the amplified Q signal and converting the detected power level and the offset value to a second digital power value and a second digital offset value using a second analog to digital converter, calculating a difference value by comparing the first digital power level value and the second digital power level value with a target power level value, calculating an amplification offset value based on the first digital offset value and the second digital offset value, and outputting an amplification control signal associated with the difference value and the amplification offset value.

2. The system of claim 1, wherein the offset adjusting unit additionally is for inputting the amplification control signal to the amplifier for adjusting gain of the amplifier.

3. The system of claim 1, wherein the offset adjusting unit further comprises a processing unit for calculating the difference value.

4. The system of claim 1, wherein the offset adjusting unit further comprises a power detector for processing the digital power level values of the amplified I and Q signals.

5. The system of claim 4, wherein the processing includes performing a square root of the sum of squared values of an inputted signal to the power detector.

6. The system of claim 4, wherein
the first digital offset value and the second digital offset value are input to an offset calculator for calculating the amplification offset value and wherein the first digital power value and the second digital power value are input to the power detector.

7. The system of claim 1, wherein the amplifier comprises a first plurality of amplifier stages for the I signal and a second plurality of amplifier stages for the Q signal, wherein the amplification control signal comprises a plurality of control signals, and wherein each of the plurality of control signals controls at least one of the plurality of amplifier stages for the I signal and at least one of the plurality of amplifier stages for the Q signal.

8. The system of claim 1, wherein the amplifier comprises:
an I offset amplifier for adjusting an I signal level and a Q offset amplifier for adjusting a Q signal level,
wherein the amplification control signal provides inputs to the I offset amplifier and the Q offset amplifier to correct any offset between the amplified I output signal and the amplified Q output signal.

9. The system of claim 1, wherein the amplifier comprises:
a first I amplifier for amplifying the I signal according to the amplification control signal;
a first I filter for noise cancellation of the outputted I signal from the first I amplifier;
a second I amplifier for amplifying a signal outputted from the first I filter according to the amplification control signal;
a second I filter for canceling noise of a signal outputted from the second I amplifier; and
an I offset amplifier for amplifying a signal outputted from the second I filter according to the amplification control signal and outputting an offset-corrected I signal.

10. The system of claim 9, wherein the amplifier further comprises:
a first Q amplifier for amplifying the Q signal according to the amplification control signal;
a first Q filter for canceling noise in the outputted signal from the first Q amplifier;
a second Q amplifier for amplifying an output signal from the first Q filter in accordance to the amplification control signal;
a second Q filter for canceling noise of a signal outputted from the second Q amplifier; and a Q offset amplifier for amplifying a signal outputted from the second Q filter in accordance to the amplification control signal and outputting an offset-corrected Q signal.

11. The system of claim 1, wherein the offset adjusting unit further comprises
a power detector for processing the first and second digital power levels
an offset calculator for calculating the amplification offset value based on the first digital signal offset value and the second digital signal offset value;
a processing unit for calculating the difference value; and
a table unit for outputting a plurality of control signals based on inputs from the processing unit, calculating a corrected gain value based the amplification offset value, and outputting the amplification control signal adjusted for the amplification offset value.

12. The system of claim 10, further comprising a table unit for outputting the amplification control signal to the first I and Q amplifiers.

13. The system of claim 10, further comprising a table unit for outputting the amplification control signal to the second I and Q amplifiers.

14. The system of claim 10, further comprising a table unit for outputting the amplification control signal.

15. The system of claim 10, further comprising:
an offset calculator for calculating the amplification offset value based on the first digital signal offset value and the second digital signal offset value and
a table unit for adding an amplification offset value applied from the offset calculator to the amplification control signal.

16. A method for enhancing a reception rate in a mobile communication terminal, the method comprising:
demodulating an incoming signal into an I signal and a Q signal and then outputting the I and Q signals;
amplifying and canceling noise of the I and Q signals and outputting the amplified and noise canceled I and Q signals, each of the amplified and noise canceled I and Q signals having a power level value and an offset value;
detecting the power level value and the amplification offset value of the amplified and noise canceled I signal and converting the detected power level and the amplification offset value to a first digital power value and a first digital amplification offset value using a first analog to digital converter;
detecting the power level value and the amplification offset value of the amplified Q signal and converting the detected power level and the amplification offset value to a second digital power value and a second digital amplification offset value using a second analog to digital converter;
outputting the first digital power level value and the second digital power level value;
calculating a difference value by comparing the first digital power level value and the second digital power level value with a target power level value;
calculating an amplification offset value of the amplified and noise canceled I and Q signals;
selecting a gain value associated with the difference value and the amplification offset value; and
adjusting amplification by amplifying the I and Q signals based on the gain value.

17. The method of claim 16, further comprising controlling an amplification control signal using a table unit for offset-correcting the I and the Q signals.

18. The method of claim 16,
wherein the first digital offset value and the second digital offset value are inputted to an offset calculator for calculating the amplification offset value.

19. The method of claim 17, wherein amplifying and canceling noise further comprises providing a first plurality of amplifier stages for the I signal and a second plurality of amplifier stages for the Q signal,
wherein the amplification control signal comprises a plurality of control signals, and
wherein each of the plurality of control signals controls at least one of the first plurality of amplifier stages for the I signal and at least one of the second plurality of amplifier stages for the Q signal.

20. A method for enhancing a reception rate of a mobile terminal in a wireless system for the mobile terminal to receive a radio signal from a network, the mobile terminal including a receiver having an automatic gain controller, the method comprising:
detecting, by an RF unit, a mobile communication signal from an RF signal wirelessly received from the network by an antenna;
inputting the mobile communication signal to a demodulating unit, demodulating and separating the mobile communication signal into I and Q signals, and outputting the demodulated and separated I and Q signals;
inputting the demodulated and separated I and Q signals to an amplifying unit having amplifiers for amplifying and filtering the signals including I and Q offset amplifiers, each of the amplified and filtered I and Q signals having a power level value and an offset value;
inputting the amplified and filtered I and Q signals to an offset adjusting unit and detecting the power level value and the offset value of the amplified and filtered I signal and converting the detected power level and the offset value of the amplified and filtered I signal to a first digital power value and a first digital offset value using a first analog-to-digital converter and detecting the power level value and the offset value of the amplified and filtered Q signal and converting the detected power level and the offset value of the amplified and filtered Q signal to a second digital power value and a second digital offset value using a second analog-to-digital converter;
calculating, using a comparing/calculating unit, a difference value by comparing the first digital power level value and the second digital power level value with a target power value input by a user;
calculating an amplification offset value for the amplified and filter I and Q signals digitized by the first and second analog-to-digital converters,
searching, using a table unit, for a amplification control signal associated with the difference value and the amplification offset value, and outputting the amplification control signal to the I and Q offset amplifiers to correct for the amplification offset value.

21. The method of claim 20, wherein the power level values are processed by a power detector of the offset adjusting unit.

22. The method of claim 20, wherein the amplification offset value is calculated by an offset calculator of the offset adjusting unit.

23. A mobile communication system for managing messages, the mobile communication system comprising:
an RF module comprising a transmitter for transmitting messages from a user of the mobile communication system and a receiver for receiving messages from another user;
means for demodulating a received message into an I signal and a Q signal and then outputting the demodulated I and Q signals;
means for amplifying and canceling noise of the demodulated I and Q signals and outputting the amplified and noise canceled I and Q signals, the amplified and noise canceled I and Q signals each having a power level value and an offset value;
a first analog-to-digital converter for detecting the power level value and the offset value of the amplified and noise canceled I signal and converting the detected power level and the offset value to a first digital power value and a first digital offset value and
for outputting the first digital power value and the first digital offset value;
a second analog-to-digital converter for detecting the power level value and the offset value of the amplified and noise canceled Q signal and converting the detected power level and the offset value to a second digital power value and a second digital offset value; and
for outputting the second digital power value and the second digital offset value;
means for calculating a difference value by comparing a difference between the first digital power level value and the second digital power level value with a target power level value;
means for calculating an amplification offset value based on the detected offset values;
means for selecting a gain value associated with the difference value and the amplification offset value; and
means for adjusting amplification of the I and Q signals based on the gain value.

* * * * *